March 28, 1967  G. B. NICHOLS  3,310,836
EXTRUDER, ETC.
Filed Sept. 25, 1964  5 Sheets-Sheet 1

INVENTOR.
GEORGE B. NICHOLS
BY *Gordon C. Mack*
ATTORNEY

March 28, 1967 G. B. NICHOLS 3,310,836
EXTRUDER, ETC.
Filed Sept. 25, 1964 5 Sheets-Sheet 2
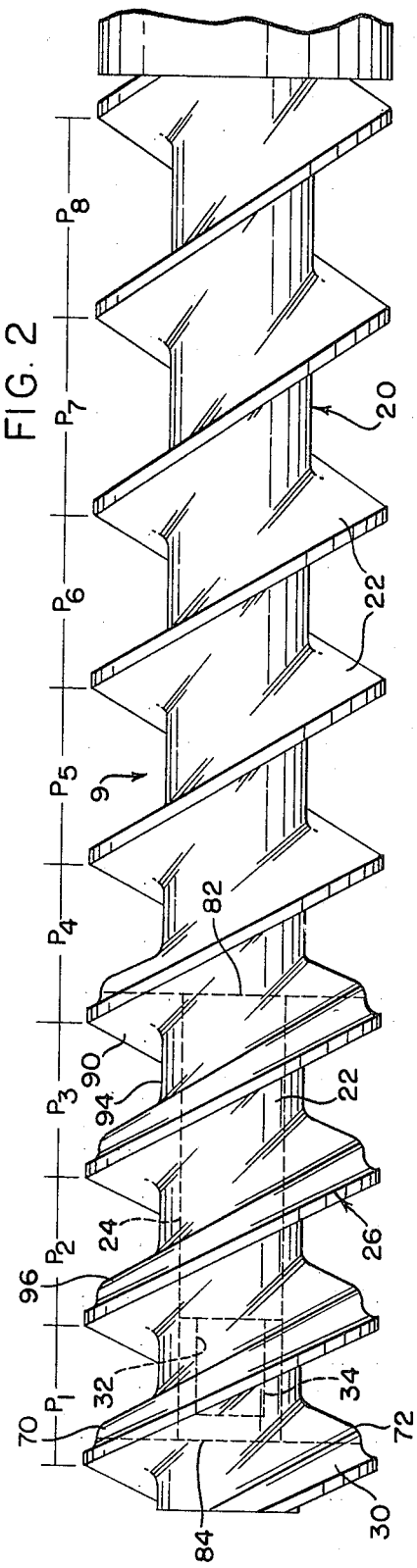
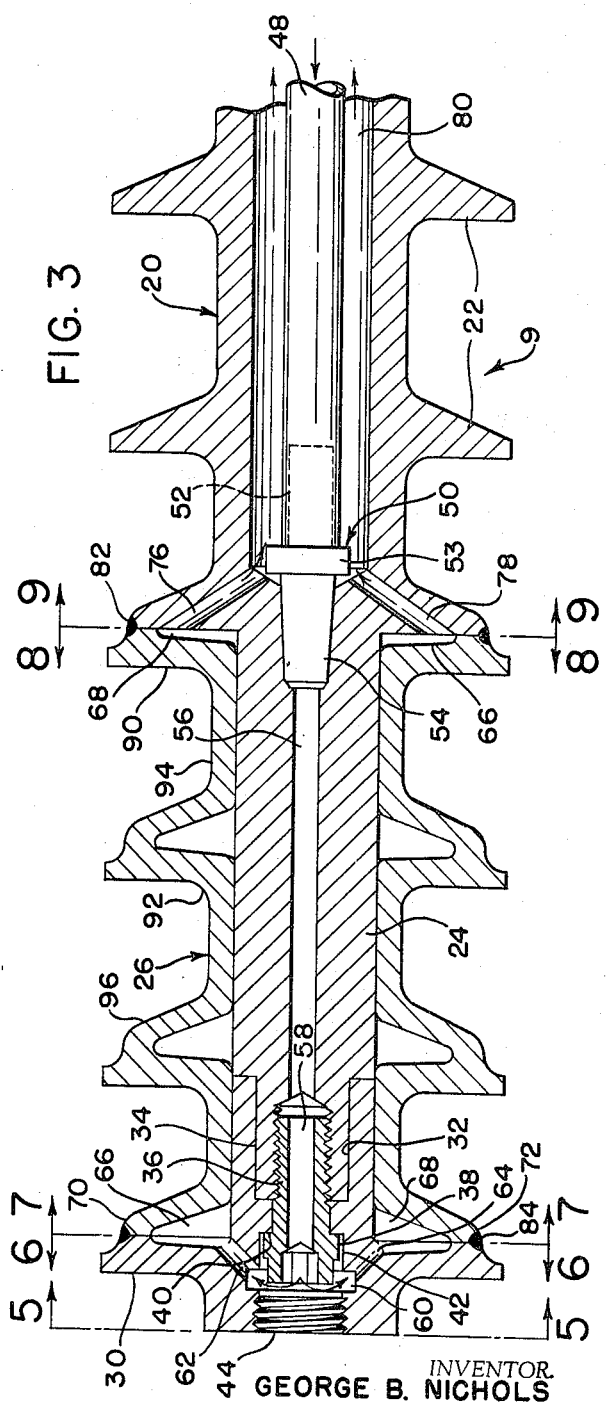
INVENTOR.
GEORGE B. NICHOLS
BY
ATTORNEY

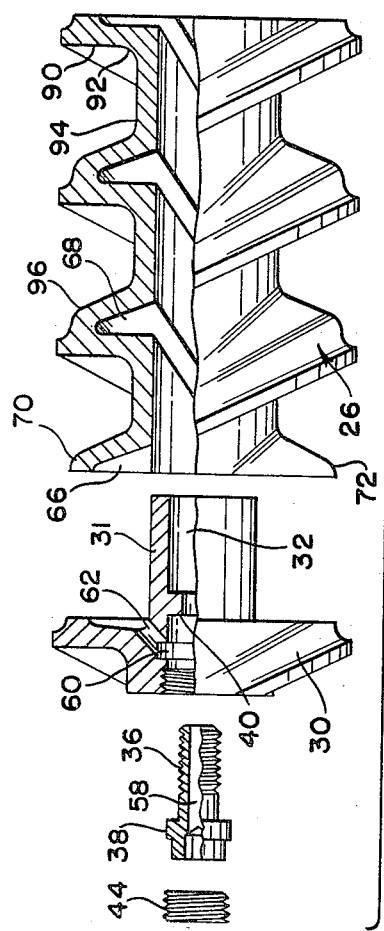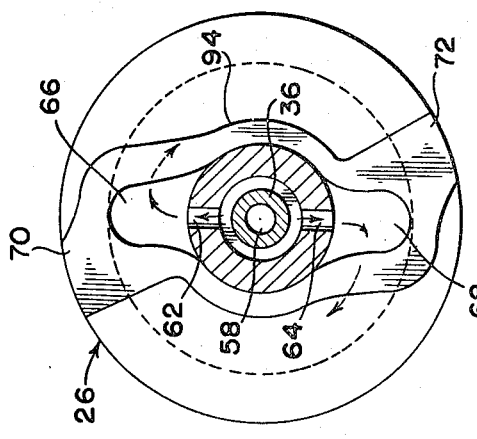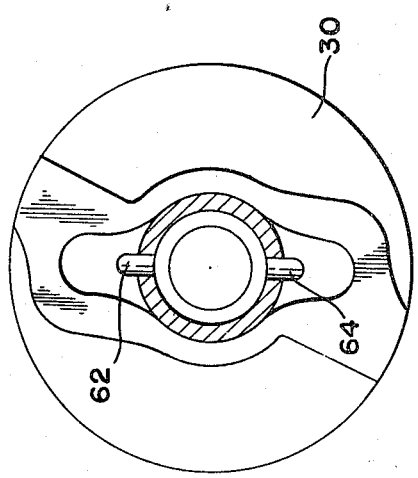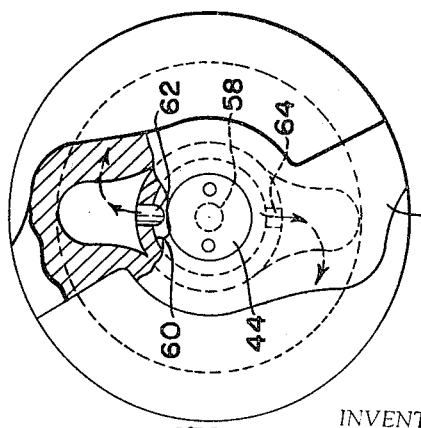
INVENTOR.
GEORGE B. NICHOLS
BY Gordon C. Mark
ATTORNEY March 28, 1967 G. B. NICHOLS 3,310,836
EXTRUDER, ETC.
Filed Sept. 25, 1964 5 Sheets-Sheet 4
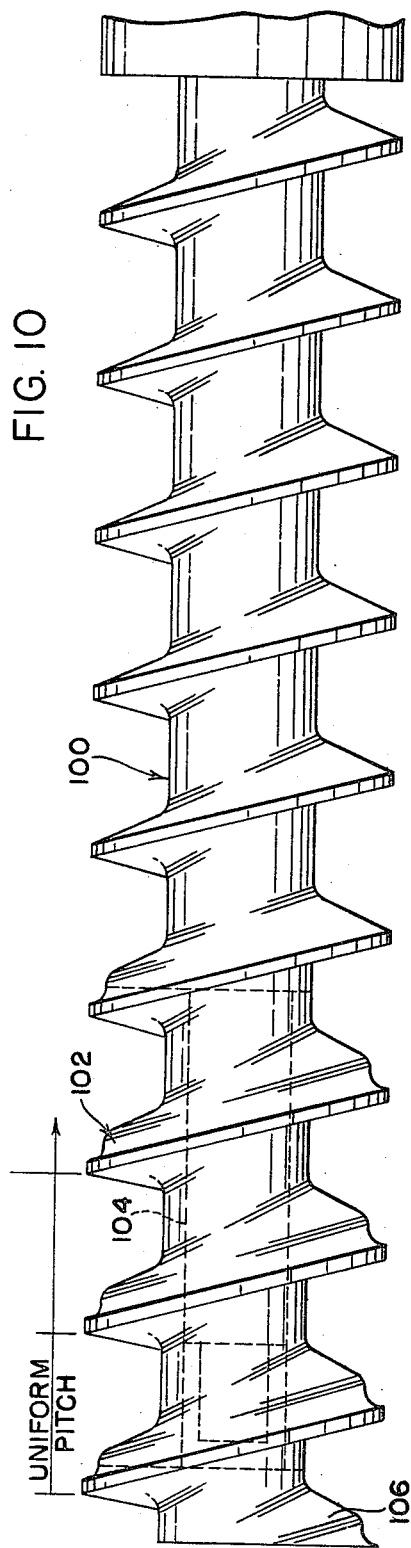
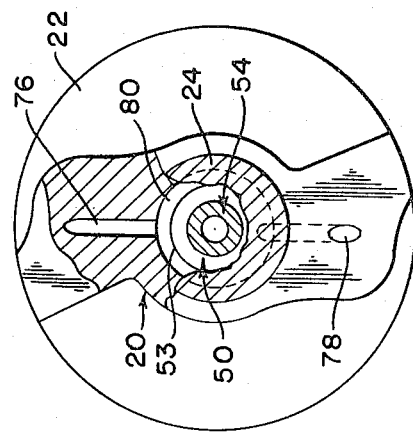
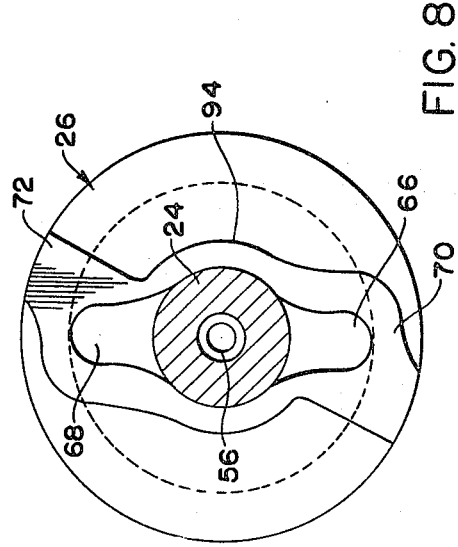
INVENTOR.
GEORGE B. NICHOLS
BY
ATTORNEY

INVENTOR.
GEORGE B. NICHOLS

ATTORNEY

United States Patent Office 3,310,836
Patented Mar. 28, 1967

3,310,836
EXTRUDER, ETC.
George B. Nichols, Akron, Ohio
(159 Homewood Ave., Barberton, Ohio 44203)
Filed Sept. 25, 1964, Ser. No. 399,149
6 Claims. (Cl. 18—12)

This invention relates to an extruder for rubber or plastic or the like and pertains more particularly to the extruder screw construction. This screw is at least in part an internal-external screw. This screw may have a single thread or multiple threads. It is preferably of variable pitch. It may have other uses than in an extruder.

Externally the screw may be of the shape commonly employed in extruders, although preferably the flight widens perceptibly adjacent to its outer edge, and inwardly from this widened portion the side of the flight opposite the pressure side has an angle similar to that of a buttress thread. The pressure area of each flight is preferably substantially perpendicular to the axis of the screw.

The extruder screw of this invention is hollow through part or all of its length and is provided with means for circulating a liquid through the hollow to heat or cool the screw, and thus regulate the temperature of the material in the extruder.

In the preferred construction, the screw is at least in part an internal-external screw. The outside diameter of the grooves of the internal screw is greater than the root diameter of the external screw. This screw may be fitted over a mandrel, so that the groove of the internal screw becomes a cavity through which a liquid can be circulated to cool or heat the screw and the extruder contents. However, it is not necessary to use a mandrel, and liquid may be circulated in one direction through substantially the whole length of the extruded screw through suitable conveying means and in the other direction outside of said means.

The internal-external screw is advantageously formed as a casting and although two or more cast portions may be utilized for producing the screw, it advantageously includes at least one portion which is a single piece of casting of variable pitch and is preferably about three to six pitches. This internal-external screw may be a single-thread screw or a screw of more than one thread such as a double-thread screw, etc.

The internal-external screw may be fabricated by machine, etc., perhaps in several pieces, but may also be cast, preferably in one piece. The production of a core for the casting is a difficult operation because one side of each flight is undercut. This is obvious from an inspection of FIGURE 2 where it is seen that the surface of the inner screw extends at an angle to the axis from the flight to the root and this necessitates an undercut. In the double-thread of FIGURE 2 there are two such undercuts opposite one another at each cross section of the screw, the one on one side being at the left of the cross section and the one on the opposite side being at the right of the cross section.

In order to produce a core for this casting, the following steps were followed and repeated to form the right and left hand core boxes:

(1) A solid aluminum core stick was machined from an aluminum casting and this was made in two parts, the division being made in a plane through the axis of the aluminum casting.

(2) Using each of these half core sticks, loose pieces were molded from plaster to take care of the undercuts caused by the threads of the core stick. A frame was built around the half stick and loose pieces. The loose pieces were formed with draw to pull out at right angles to the axis. Thus there was a plaster loose piece at each undercut of the half core stick.

(3) A wooden box was formed around these loose pieces but with a little space outside of the pieces for molding a box around the pieces, with spaces between these pieces to provide flight-forming webs connecting the two sides of the box between the loose pieces. The loose pieces were placed in position adjacent the half core stick and plaster was cast in the space thus provided around and between the loose pieces and the core stick.

(4) Sand molds were made from this plaster box and the plaster loose pieces.

(5) An aluminum core box and aluminum loose pieces were cast from these sand molds. The parts were polished and fitted together to form the core box. Right and left hand core boxes were made in this way, and then:

(6) A ceramic core was made from these core boxes with the loose pieces fitted into them.

(7) The internal-external screw was cast from steel using this ceramic core. On cooling, the casting crushed the core and it was thus easily removed from the hollow of the casting.

In working rubber or plastic in an extruder, the greatest heat is generated near the exit and where the die is located. The screw of this invention is provided with means for circulating water or other liquid through at least this end of the screw to control the temperature of the contents of the extruder. In the treatment of rubber, cooling may be desirable to reduce the tendency to scorch, or if the rubber is introduced cold, it may be heated, and furthermore by controlling the heating of the stock the cure may be accelerated, reducing the subsequent curing time without danger of scorching the stock. Plastic may be heated or cooled. This temperature control means may extend through only a part of the screw but may extend the entire length of the screw.

If the screw includes a portion which is an internal-external portion, this portion is preferably fitted over a mandrel which extends from the remainder of the screw. The internal-external screw is located adjacent the exit end of the extruder.

Rubber and usually plastic become more adhesive when heated and it is one of the objects of this invention to provide for cooling rubber or plastic in an extruder and thus reduce its adhesion to the screw. Therefore, the throughput of an extruder is greatly increased by cooling the screw to prevent the adhesion of the extruder contents to it.

The invention will be further described in connection with the accompanying drawings in which the cooling of stock is referred to more particularly.

FIGURE 2 is an enlarged view of this screw;

FIGURE 3 is a sectional detail on an enlarged scale, showing that a portion of the screw is formed in the regular manner but hollow, and another portion is formed largely of an internal-external variable pitch screw;

FIGURE 4 is an exploded view of the screw shown in FIGURE 3;

Figure 11:
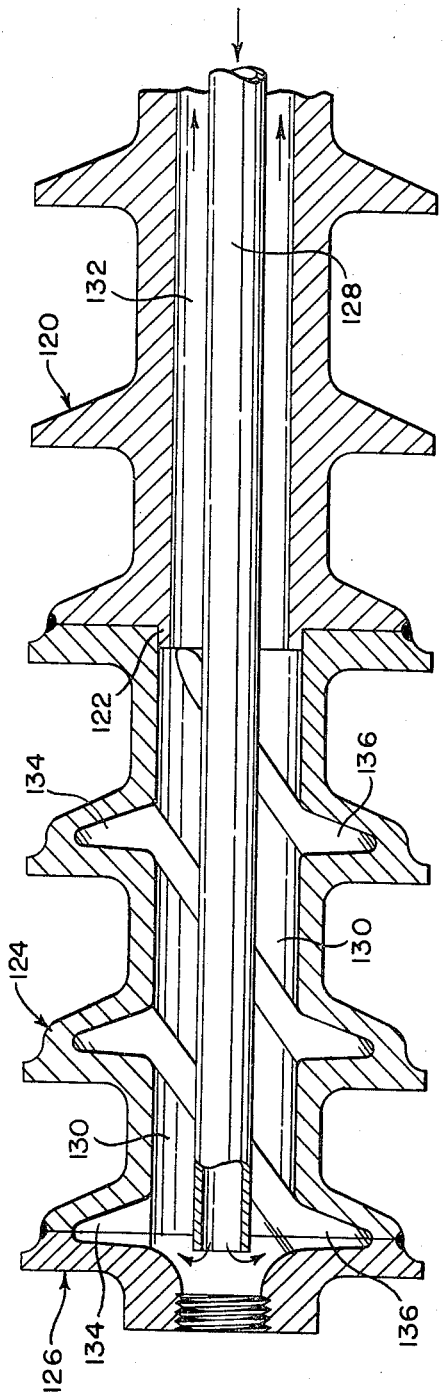

FIGURES 5, 6, 7, 8 and 9 are sections, partially broken away, taken on the lines 5—5, 6—6, 7—7, 8—8 and 9—9 respectively, of FIGURE 3;

FIGURE 10 is a view of a single thread screw of uniform pitch the end portion of which is an internal-external screw casting; and FIGURE 11 is a view of an internal-external extruder screw equipped for the circulation of a heating or cooling liquid therethrough.

Figure 1:
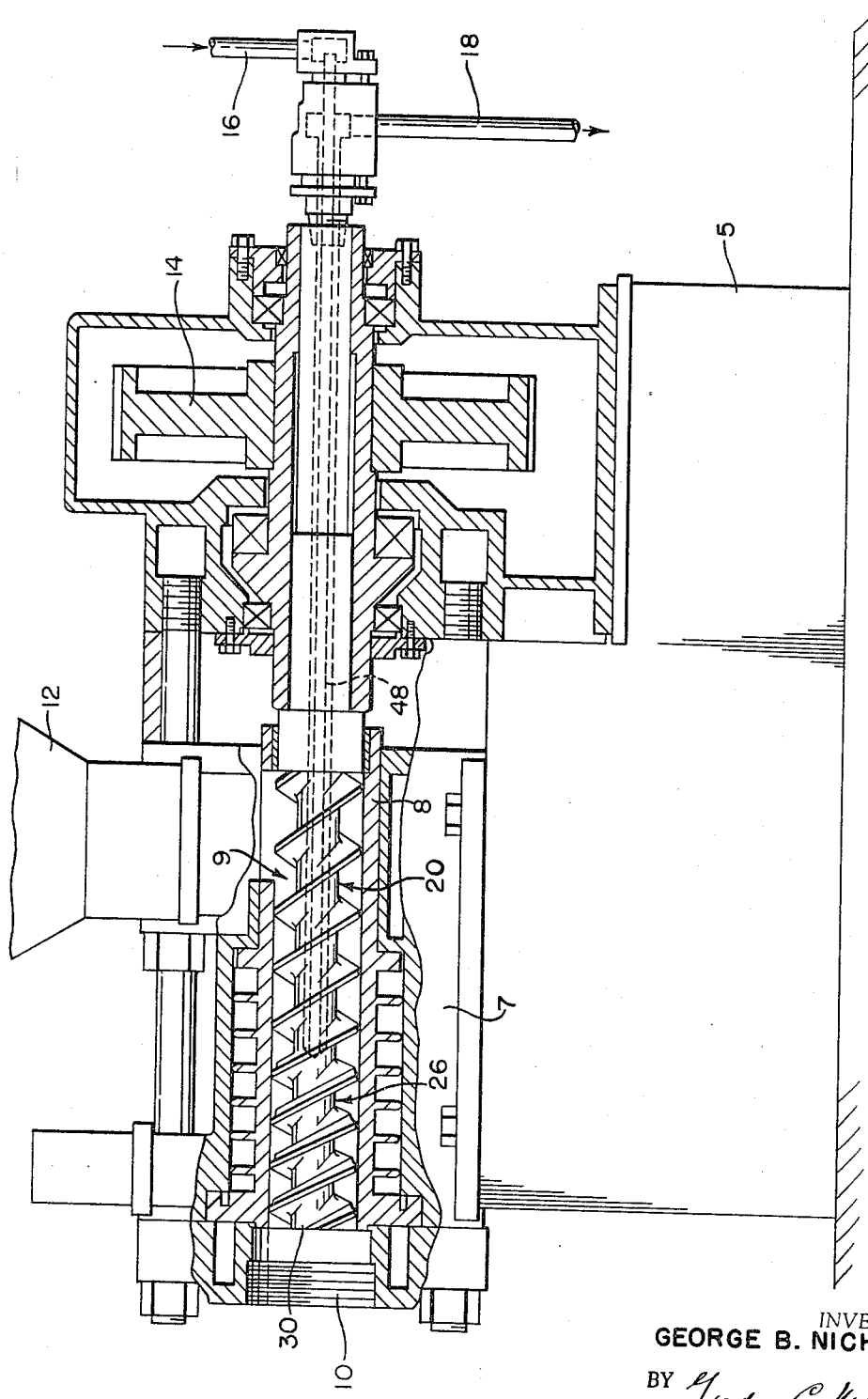
FIGURE 1 is an elevation, partly in section, of an extruder equipped with a screw of a preferred construction.

In FIGURE 1 the extruder is mounted on a base 5; the extruder casing 7 includes the barrel 8, the screw 9 and the threaded opening 10 for the die holder. The screw is of variable pitch. The rubber or plastic or other material to be extruded is fed through the funnel 12. The extruder is driven by any usual means as by a gear which meshes with the pinion 14. Cooling water is introduced through the inlet pipe 16 and travels substantially the length of the screw and after returning is exhausted through the outlet 18.

As shown in FIGURES 2, 3 and 4 and the sections 5 through 9, the screw 9 is formed of three parts as most clearly shown in FIGURES 3 and 4. A double-thread screw is illustrated in these figures. The portion 20 is provided with flights 22. This may be made from solid stock in any usual manner. The mandrel 24 is integral with the portion 20 and extends toward the extruder head from the point where flights 22 end. Fitting over this mandrel is the variable-pitch internal-external screw 26 which is made from a casting. As the rubber or the like approaches the die, it is desirable to reduce the pitch and thus increase the pressure exerted against the contents of the extruder as it is passed through the die. The length of the casting 26, which is an internal-external screw, may vary but usually includes three to six pitches. The portion 20 is shown as having a variable pitch although it may be of uniform pitch. The difference in the pitch as it increases from one end of the screw toward the other is indicated by the marked dimensions $P_1$, $P_2$, etc. in FIGURE 2.

The terminal casting 30 forms a cap which fits over the end of the mandrel and flush against the end of the casting 26. The central extension 31 of the end casting 30 is counterbored at 32 (FIGURES 3 and 4) to receive the extension 34 of the mandrel 24. This extension 34 is internally threaded to receive the hollow socket-head cap screw 36. The head of the cap screw fits against the shoulder 40 of the counterbore 42 in the extension 31 of the cap and this in effect holds the internal-external screw 26 against the screw of portion 20. The plug 44 screws into the casting 30 and forms a liquid tight seal with it.

The structure is clearly understood by tracing the flow of liquid down through the center of the screw and back around this central portion to the outlet 18. The inlet 16 is connected with the pipe 48 (FIGURE 3). A nozzle 50 is provided with a hollow extension 52 (FIGURE 3) which fits into the end of the pipe 48 forming a snug fit with it. The central portion 53 makes a slip fit in the counterbore at the end of the hollow in the screw portion 20. The opposite end 54 of the nozzle fits into the end of the mandrel 24 and the hollow through this end 54 coincides with the hollow 56 which extends through the mandrel 24 to the cap screw 36. The hollow 58 of the cap screw is aligned with the hollow 56 of the mandrel. The cooling liquid flows in at 16 through the pipe 48 and then through hollows 56 and 58 and out through the counterbore 60 into the passages 62 and 64 in the end casting 30.

Although in FIGURE 3 it appears that the flight on the screw does not extend to the end of the screw, this is an illusion because FIGURE 3 is merely a section through the screw and doesn't show the extension of the flight as it is shown in FIGURE 2.

The openings 62 and 64 in the two flights of the end casting 30 (FIGURES 6 and 7) connect with the openings 66 and 68 in the two flights 70 and 72 of the long casting 26. The cooling liquid circulates through these flights in the hollows provided between the surface of the internal screw and the outer surface of the mandrel. From the inner end of this casting 26 the liquid flows through the openings 76 and 78 in portion 20. These connect with the space 80 around the pipe 48 and the liquid flows thence back to the outlet 18. The inlet 16 and outlet 18 do not rotate with the screw but are stationary.

The casting 26 may be welded to the portion 20 and to the end casting 30 as indicated at 82 and 84. The parts may be brazed together or held together in any other suitable manner. For instance, instead of the weld 82, there may be a gasket which is tightened between the two screw parts by tightening the cap screw 36.

In producing this composite screw, the castings 20 and 30 are advantageously first brought to their final positions with respect to the mandrel and then the threads are machined to the desired final contour.

The entire screw may be of uniform pitch or it may be of variable pitch. The portion 20 may be of uniform pitch and the cast portion 26 may be of variable pitch. It is desirable to have at least the end portion of the extruder screw nearest the die of variable pitch to provide good pressure on the extruded material as it passes through the die.

It is understood that the internal-external screw 26 may be machined instead of cast, but if of a variable pitch a casting will usually be preferred.

FIGURE 10 illustrates a screw of the same overall general structure. The portion 100 is machined from a cylinder and the cast portion 102 fits tightly over the mandrel 104 which extends from the portion 100. The end casting 106 is similar to the casting 30. This figure illustrates a single thread screw of uniform pitch from one end to the other.

The extruder screw of FIGURE 11 is a modification of the screw shown in the earlier drawings. The portion 120 with a solid thread is provided with the registering flange 122 over which one end of the internal-external screw casting 124 fits. The end cap 126 covers the outer end of the opening in the casting 124.

The pipe 128 is supported at its inner end in any suitable fashion and extends substantially the entire length of the extruder screw. It may be supported at other points. Liquid may be introduced into the pipe to flow in the direction of the arrow to the outer end of the extruder screw and thence flows back through the hollow 130 of the casting 124 and the opening 132 through the portion 120. If the cooling liquid flows in this direction, as it leaves the end of the pipe 128 it flows with great turbulence through the casting due to several conflicting forces. The centrifugal force caused by the rotation of the screw forces the liquid into the outside diameter of the cavities in the flights. The rotation of the screw forces the liquid toward the outer end of the cavities in the flights and therefore it is always changing in the flights and is being forced toward the outer end of the screw. The pressure of the liquid coming in pipe 128 forces liquid out through cavities 130 and 132. The liquid returning in this manner is drawn off from the extruder in any desirable manner and the means of supplying water to the pipe 128 is conventional. The direction of the flow of the liquid may be reversed. Screws 124 and 126 may be cast in a single piece. Furthermore, all or a part of screw 120 may be cast in the same piece, preferably as an internal-external screw.

The castings as shown illustrate a preferred screw construction in which the pressure area 90 (FIGURE 2, etc.) which faces the exit end of the extruder is substantially perpendicular to the axis of the screw. It may vary a few degrees from the perpendicular but by making it substantially perpendicular to the axis and joining it at radius 92 to the root portion 94 of the screw, most efficient operation is obtained with increased throughput of rubber or the like, particularly when the screw is cooled.

The opposite side of each flight is preferably provided with a hump 96 adjacent the outer edge of the flight for several reasons. It is not advisable to bring the cooling chamber farther to the edge of the flight. This structure provides substantially uniform wall thickness which is desirable for maximum cooling. Furthermore, by providing an abrupt wall for the cooling chamber the area of contact between the contents of the extruder and the barrel is increased and it seems that this speeds the movement of the stock forward.

The extruder shown in FIGURE 1 is conventional except for the screw structure and cooling system thereof and the invention is not limited with respect to such conventional structure. It is defined in the claims which follow:

What I claim is:

1. An extruder screw at least a section of which has external flight means and at least a portion of said section is a hollow element the hollow of which extends into at least a portion of the external flight means.

2. The screw of claim 1 in which the hollow element is a casting.

3. The screw of claim 2 in which the external flight means is of variable pitch.

4. An extruder having an extruder screw at least a section of which has external flight means and at least a portion of said section is a hollow element the hollow of which extends into at least a portion of the external flight means, and the extruder includes means for driving the screw and for circulating through the hollow element a medium to control its temperature.

5. The extruder of claim 4 in which the hollow element is a casting and the flight means is of variable pitch.

6. A screw which is composed of a plurality of parts, one part having a solid external thread and a mandrel extending axially from one end thereof, and another part being a hollow screw with both internal and external threads with at least one external thread extending substantially the entire length of its outer surface and with an internal thread extending into said external thread, the external thread of the hollow screw being a continuation of said solid external thread, and the internal thread of the hollow screw contacting the mandrel throughout a substantial portion of its length.

References Cited by the Examiner

UNITED STATES PATENTS

| | | | |
|---|---|---|---|
| 902,850 | 11/1908 | Auchu | 18—12 |
| 1,516,841 | 11/1924 | Buttfield | 18—12 |
| 1,886,592 | 8/1932 | Royle. | |
| 1,904,884 | 4/1933 | Royle. | |
| 1,951,427 | 3/1934 | Lodge. | |
| 1,978,163 | 11/1934 | Megow. | |
| 2,200,997 | 5/1940 | Royle | 18—12 |
| 2,427,960 | 9/1947 | Griffiths. | |
| 2,480,615 | 8/1949 | Strain et al. | |
| 2,547,151 | 4/1951 | Braeseke. | |
| 2,549,400 | 4/1951 | Thornberg. | |
| 2,639,464 | 5/1953 | Magerkurth. | |
| 2,695,422 | 11/1954 | Gray | 18—12 X |
| 2,738,932 | 3/1956 | Rietz | 18—12 |
| 2,764,780 | 10/1956 | Reifenhauser | 18—12 |
| 2,787,022 | 4/1957 | Chisholm | 18—12 |
| 2,813,302 | 11/1957 | Beck | 18—12 X |
| 2,826,492 | 3/1958 | Morash. | |
| 2,946,089 | 7/1960 | Heston | 18—12 |
| 2,952,873 | 9/1960 | Poter. | |
| 3,023,455 | 3/1962 | Geier et al. | 18—12 |
| 3,035,304 | 5/1962 | Reifenhauser | 18—12 X |
| 3,035,306 | 5/1962 | Rossiter | 18—12 X |
| 3,204,289 | 9/1965 | Barlow et al. | |

FOREIGN PATENTS 1,206,810  8/1959  France.

WILLIAM J. STEPHENSON, *Primary Examiner.*